Feb. 7, 1967  R. P. CARTER  3,303,079
METHOD OF MANUFACTURE OF ROCKET CHAMBERS HAVING AN
INTEGRAL INSULATOR OR LINER
Filed Aug. 23, 1963
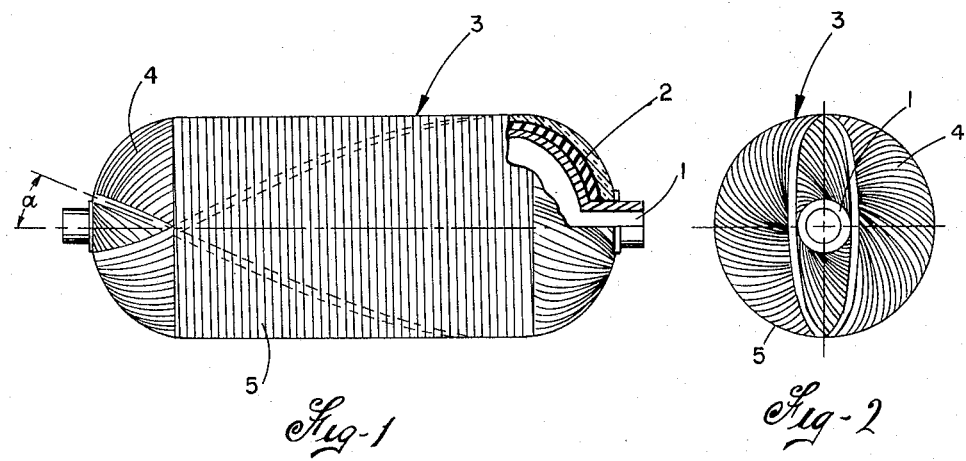
INVENTOR.
RICHARD P. CARTER
BY
ATTORNEY

United States Patent Office 3,303,079
Patented Feb. 7, 1967

3,303,079
METHOD OF MANUFACTURE OF ROCKET CHAMBERS HAVING AN INTEGRAL INSULATOR OR LINER
Richard P. Carter, Morris Plains, N.J., assignor, by mesne assignments, to the United States of America as represented by the Secretary of the Navy
Filed Aug. 23, 1963, Ser. No. 304,293
2 Claims. (Cl. 156—172)

This invention relates to filament wound hollow elements and methods for making the same, and is particularly concerned with a new and improved process for the manufacture of rocket casings having an integral liner therein.

Though some work has been done in the field of forming rocket casings having an insulating liner therein, a major drawback in the process was that the insulators had to be fitted separately for the various chamber designs. This was done by laying-up and curing the liner under pressure on a mandrel or mold. The liners were then ground to the required outside dimensions of the rocket casing. The process of the subject invention eliminates this drawback of the prior art and contemplates the provision of a method that would permit the liner fabricating step to be compatible with a step for winding a glass filament around the liner whereby both the liner and the filament could be cured in one operation.

In my invention, the benefits of strength and durability characteristic of glass filament layers are obtained and in addition the benefits of interlocked or interwound adjacent spiral loops will also be obtained by a method which is commercially feasible and economical.

My invention, briefly described, comprises winding glass filaments helically upon a calendered insulation material in an uncured sheet form which has been laid-up on a suitable mandrel and curing both the glass filaments and the insulation material at the same time.

Additional and more detailed objects of the invention will in part be obvious and in part be pointed out as the description of the invention, taken in conjunction with the accompanying drawing proceeds.

In that drawing:

FIG. 1 is a side elevation in partial section of a pressure cylinder laid-up on a cylindrical mandrel illustrating the application of my improved process.

FIG. 2 is a top plan view of the device as shown in FIG. 1.

The usual procedure used to make rocket chambers is to purchase insulators from an outside source. These may be made by lay-up and curing under pressure on a mandrel or mold. They are then ground to the required outside dimensions.

The time required for an insulator manufacturer to create a new design has run into months; therefore, it was thought that time could be saved and a better structure could be achieved if glass filaments were to be wound directly over uncured rubber and the whole cured at the same time. Since rubber exerts a considerable pressure during the curing process, it was discovered that a chamber made in this manner possessed improved insulation consolidation, better insulation to glass adhesion and improved case integrity due to the cure under strain.

Referring in detail to the drawing, sheet stock of an uncured rubber insulator 2 having a calendered thickness of .080 inch was laid upon a cylindrical mandrel 1. The insulator was cut to follow the outline of the mandrel. A pressure cylinder 3 comprising bands of glass filaments was formed in layers upon the rubber insulation. One layer of a filament band is considered to be the complete path from the beginning of a right hand helix at one end of the mandrel, through the end pattern at the other end of the mandrel, back as a left hand helix, plus the second end pattern and to the beginning of the next right hand helix. A one-half layer would be a winding in one direction only.

These filament bands are applied to the mandrel by means of a carriage which travels from one end of the mandrel to the other and back again. To form a casing having a wall thickness of 0.180 inch, 9½ layers of glass filament bands were applied directly to the rubber insulation at a 90° angle to the horizontal axis of the mandrel and 8 helical layers, as indicated by the numeral 4, were interspersed between the levelwind layers at a 25° angle α to enable the casing to have sufficient girth strength. Ordinarily, although not necessarily so, the winding of the casing begins with the helical windings, followed by the circular windings, then additional helical windings and then finishing with circular windings. This will become evident from the winding pattern schedule illustrated in the examples that are described hereinbelow. The filaments are coated with a plastic binder which secures the filaments together and fills any voids between the filaments so that a complete coverage of the rubber insulation is effected. The plastic material employed as a binder is kept to a minimum and is squeezed out as the application of the bands progresses. On the completion of that application, any excess of the binder can be wiped off while it remains in the fluid state. Any of the epoxy resins were found to be suitable for use as a thermosetting type binder.

The rubber liner and the glass filament bands were subjected to an extended curing cycle of 9 hours at a temperature of 320° F.±10° F. This step of curing both the rubber insulation and the glass filament bands in one operation causes a consolidation of the rubber through use of the compressive load naturally applied by the glass filaments. The amount of rubber consolidation and the net shrinkage will depend on the type of rubber used.

The following examples are offered to demonstrate the advantages of this new simplified process for the manufacture of rocket cases with elastomer linings:

Example I

Referring to the drawing, sheet stock of Buna N rubber 21, having a calender thickness of .08 inch, was laid up on a 6" pressure cylinder 1 to form a ½" thick liner.

Six helical layers 4 of glass filaments were wound on top of the rubber stock, followed by 6 layers of levelwind 5. Two more helical layers were added to the casing 3 followed by 3½ layers of levelwind. The unit was cured for two hours at 320° F. One thermocouple recorded skin temperature and two others determined the temperature at the interface between the rubber and the winding. The oven temperature was maintained at 330° F. for an additional 7 hours until the skin temperature reached 330° F. The interface temperature reached 300° F. after 9 hours. The unit burst at 1517 p.s.i. and registered a girth stress of 70,000 p.s.i.

General consolidation of the unit was very good. An overall rubber shrinkage of 5–6% existed which accounted for an increase in the inside diameter of the liner compared to its "as laid-up" inside diameter. A temporary expansion lowering of the viscosity at the rubber interface does take place during curing which allows some redistribution of material to equalize the winding pressures applied by the filament winding.

Example II

Sheet stock of Buna S-asbestos rubber 21 having a calendered thickness of .08 inch, was laid up on a 6" hydroburst bottle 1 to form a ½" thick liner.

Two helical layers 4 of glass filaments were wound on top of the rubber stock, followed by 2 layers of levelwind 5. One more helical layer was added to the casing 3 followed by 1½ layers of levelwind. This unit was cured at 300–310° F. for two hours and at 330° F. for seven hours.

This unit gave a burst pressure of 2000 p.s.i. and a girth stress of 92,000 p.s.i. There was approximately a .030 consolidation of the rubber after winding and cure.

*Example III*

Sheet stock of Buna N-phenolic-boric acid rubber was laid up on a 6″ hydroburst bottle 1. Two helical layers 4 of glass filaments were wound on top of the rubber stock followed by 2 layers of levelwind 5. One more helical layer was added to the casing 3 followed by 1½ layers of levelwind. This unit burst at 1790 p.s.i. and had a girth stress of 81,000 p.s.i. On this winding, the rubber was consolidated some .020 inch after winding and cure; however, it differed from the rubber employed in Example II in that the casing 3 could not be easily slid off the mandrel. It had to be driven off indicating that a net shrinkage did not occur.

In the foregoing description, glass has been indicated as the preferable filament material. This is due to the strength, corrosion resistance and availability of such material on an economical basis. It is, of course, to be understood, however, that the method of the invention is not limited to the use of such filaments, but rather that any desired and suitable filament material can be used if desired.

From such illustration, it will be evident to those skilled in the art that the invention procedures are fully applicable to the forming of a wide range of hollow elements. It is accordingly to be understood that changes may be made in the above method, and modifications may be made in the structures and combinations of the same which embody the invention without departing from the scope of the invention. It is thus intended that all matter contained in the description, or shown in the accompanying drawing, shall be interpreted as illustrative and not in a limiting sense.

The invention claimed is:

1. An improved method for forming a pressure casing having an integral insulated liner therein, said method comprising the steps of:
    (a) laying-up an uncured sheet of calendered rubber stock onto a suitable hollow mandrel;
    (b) winding six layers of a glass filament on top of the rubber stock at a 25° angle to the horizontal axis of the mandrel;
    (c) winding six layers of a glass filament on top of the 25° helix at a 90° angle to the horizontal axis of the mandrel and crossing said first 25° helix at a plurality of positions;
    (d) adding two layers of a glass filament on top of the rubber stock at a 25° angle to the horizontal axis of the mandrel whereby a total of 8 layers have been wound on top of the rubber stock;
    (e) adding 3½ layers of a glass filament on top of the said 25° helix at a 90° angle to the horizontal axis of the mandrel whereby a total of 9½ layers have been wound on top of the 25° helical windings;
    (f) introducing a settable binder onto said glass filaments;
    (g) simultaneously curing both the rubber sheet and the glass filaments in an oven; and
    (h) holding the curing temperature at 320° F.±10° F. for nine hours whereby the sheet of calendered rubber stock and the glass filaments are firmly bound together to form a pressure casing having improved insulation consolidation, better insulation to glass adhesion, and improved case integrity.

2. An improved method for forming a pressure casing having an integral insulated liner therein, said method comprising the steps of:
    (a) laying-up an uncured sheet of calendered rubber stock onto a suitable hollow mandrel;
    (b) winding two layers of a glass filament on top of the rubber stock at a 25° angle to the horizontal axis of the mandrel;
    (c) winding two additional layers of a glass filament on top of the 25° helix at a 90° angle to the horizontal axis of the mandrel and crossing said first 25° helix at a plurality of positions;
    (d) adding a layer of glass filament on top of the rubber stock at a 25° angle to the horizontal axis of the mandrel whereby a total of 3 layers have been wound on top of the rubber stock;
    (e) adding 1½ layers of a glass filament on top of the said 25° helix at a 90° angle to the horizontal axis of the mandrel whereby a total of 3½ layers have been wound on top of the 25° helical windings;
    (f) introducing a settable binder onto said glass filaments;
    (g) simultaneously curing both the rubber sheet and the glass filaments in an oven; and
    (h) holding the curing temperature at 320° F.± 10° F. for nine hours whereby the sheet of calendered rubber stock and the glass filaments are firmly bound together to form a pressure casing having improved insulation consolidation, better insulation to glass adhesion, and improved case integrity.

References Cited by the Examiner

UNITED STATES PATENTS

| | | | |
|---|---|---|---|
| 1,033,010 | 7/1912 | Harris | 156—173 |
| 3,047,191 | 7/1962 | Young. | |
| 3,210,228 | 10/1965 | Bluck | 156—173 |

EARL M. BERGERT, *Primary Examiner.*

J. P. MELOCHE, *Assistant Examiner.*